United States Patent [19]

Nickum

[11] Patent Number: 5,794,355
[45] Date of Patent: Aug. 18, 1998

[54] ROTATIONALLY ACTUATED POSITION SENSOR

[75] Inventor: Larry A. Nickum, Sioux City, Iowa

[73] Assignee: Gateway 2000, Inc., North Sioux City, S. Dak.

[21] Appl. No.: 655,701

[22] Filed: Jun. 3, 1996

[51] Int. Cl.⁶ .................................................. G01C 9/06
[52] U.S. Cl. .................................. 33/366; 33/377; 33/390
[58] Field of Search .............................. 33/366, 377, 379, 33/390, 365, 378, 389

[56] References Cited

U.S. PATENT DOCUMENTS

| | | | |
|---|---|---|---|
| 669,068 | 3/1901 | Arthur | 33/390 |
| 812,251 | 2/1906 | Alexander | 33/389 |
| 1,730,109 | 10/1929 | Bacon | 33/377 |
| 3,009,255 | 11/1961 | Robillard | 33/390 |
| 3,863,067 | 1/1975 | Gooley | 33/366 |
| 4,154,000 | 5/1979 | Kramer | 33/366 |
| 4,254,334 | 3/1981 | Baud | 250/231 R |
| 4,307,516 | 12/1981 | Walker | 33/366 |
| 4,332,090 | 6/1982 | Bailey et al. | 33/366 |
| 4,590,680 | 5/1986 | Hanchett et al. | 33/366 |
| 4,603,484 | 8/1986 | Strothmann | 33/366 |
| 4,862,172 | 8/1989 | Ross | 341/157 |
| 4,956,922 | 9/1990 | Bodewes | 33/366 |
| 5,101,570 | 4/1992 | Shimura | 33/366 |
| 5,218,771 | 6/1993 | Redford | 33/366 |
| 5,363,120 | 11/1994 | Drumm | 345/158 |

FOREIGN PATENT DOCUMENTS

| | | | |
|---|---|---|---|
| 2564580 | 11/1985 | France | 33/390 |

*Primary Examiner*—G. Bradley Bennett
*Attorney, Agent, or Firm*—Schwegman, Lundberg, Woessner & Kluth, P.A.

[57] ABSTRACT

A position sensor comprises two curved surfaces concentrically aligned to form a container which is filled with a viscous fluid and a bubble of a lighter-weight fluid and placed between a radiation source and a radiation detector. The bubble changes position within the container when the sensor is moved, transmitting a beam of radiation from the radiation source through the bubble to activate a section of the radiation detector while the remainder of the radiation is blocked by the fluid. Position sensing circuitry translates a signal from the activated section of the radiation detector into position coordinates for point in space corresponding to the position of the bubble in the container.

23 Claims, 4 Drawing Sheets

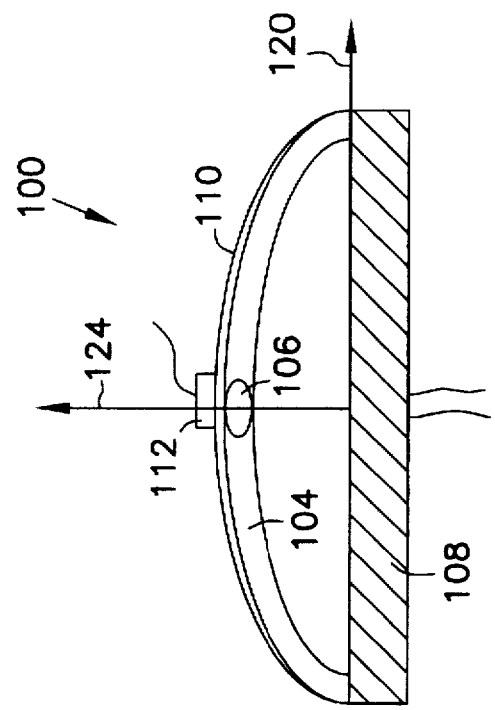
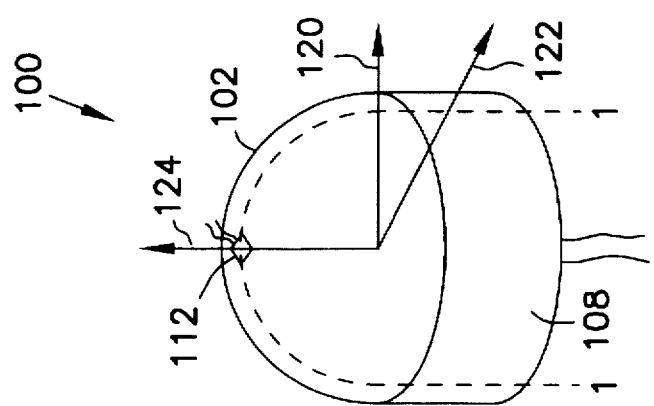
FIG. 1b
FIG. 1a

ROTATIONALLY ACTUATED POSITION SENSOR

FIELD OF THE INVENTION

The present invention is related to position sensors and in particular to a sensor that uses a bubble suspended in a fluid medium to determine positions in a two-dimensional reference system.

BACKGROUND OF THE INVENTION

A carpenter's level using a vial containing a fluid and a suspended bubble that is centered in the vial when the instrument is placed on a level surface is well-known. However, the basic carpenter's level is only useful for determining whether the surface is level and not at what angle the surface may be inclined. In recent years, the carpenter's level has been enhanced by incorporating electronic level sensing devices in place of, or in addition to, the vial, fluid, and bubble. One purpose of the improved carpenter's levels is to determine the inclination angle of the surface. However, an inclination angle cannot be used to specify a point in space, as the angle is expressed in terms of a single degree of freedom—its rotation about one axis—while a point in space must be defined in terms of at least two degrees of freedom.

Other devices designated as orientation sensors work on the same principal as the carpenter's level but employ different shaped containers for the fluid and the bubble. These devices suffer from the same limitations of the carpenter's level in that they only detect changes in a single degree of freedom. In addition, these device reflect light off the bubble to determine the orientation of the device so the light must transit the fluid twice, once to bounce off the bubble, and again when reflected to a detector. Diffraction and refraction problems introduced by the light's path and also by its reflection off the bubble lead to inaccuracies in measurement unless the device is carefully manufactured and calibrated, making the production of such a device a complex and costly process.

There is a need for a device that combines the ability to define positions in space in a two-dimensional coordinate system with simplicity of manufacturing and long-lived accuracy.

SUMMARY OF THE INVENTION

Two curved surfaces are concentrically aligned to form a container which is filled with a viscous, radiation-absorbent fluid and a bubble of a lighter-weight, radiation-transmissive fluid that changes position within the container in response to rotational movement of the container about two axis. The container is placed between a radiation source and a radiation detector to form a position sensor. A portion of electromagnetic radiation from the radiation source is transmitted through the bubble and activates a section of the radiation detector while the remainder of the radiation is blocked by the fluid. Points in a two-dimensional plane are equated to positions of the bubble within the container so that the section of the radiation detector that is activated by the radiation transmitted through the bubble corresponds to a point in the plane. By assigning position coordinates to each section of the radiation detector, position sensing circuitry is able to translate a signal from the activated section of the radiation detector into position coordinates for the corresponding point.

The rotationally actuated position sensor is suitable for use in any apparatus that relies on a two-dimensional coordinate system, such as geographical tracking systems, and surveying equipment. The position sensor is also applicable to computer-input devices that logically use a pair of coordinates to address a point on a computer screen, and replaces the ball currently used in input devices such as mice and trackballs so that the user is no longer constrained to using the device on a surface. The position sensor also does not become jammed as ball-controlled input devices currently do which causes great user frustration.

The rotationally actuated position sensor addresses the limitations found in the prior art devices. The electronic components are long-lived, the radiation source is replaceable, and, when made of high-impact plastics, the sensor is virtually indestructible. Furthermore, the sensor is simple and inexpensive to manufacture as it incorporates common materials, off-the-shelf components, and it does not incur the diffraction and refraction problems inherent in the prior art. Finally, its degree of accuracy is high, will not degrade over time, and can be calibrated to the specific application in which the sensor is employed.

BRIEF DESCRIPTION OF THE DRAWINGS

FIG. 1a is a perspective view of an embodiment of a position sensor.

FIG. 1b is a cross-section view of the position sensor shown in FIG. 1a taken along line 1—1.

DESCRIPTION OF THE EMBODIMENTS

Figure 2:
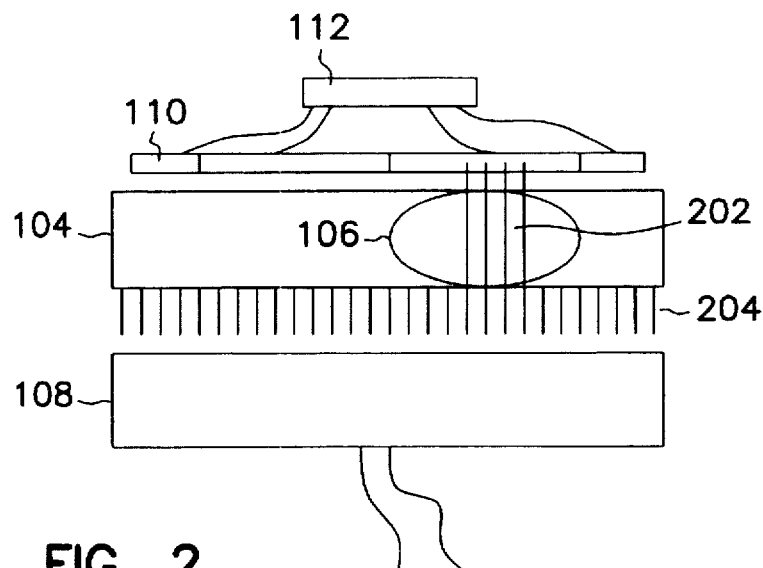
FIG. 2 is a functional diagram of the position sensor.

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Numbering in the Figures is usually done with the hundreds digits corresponding to the figure number, with the exception that identical components which appear in multiple figures are identified by the same reference numbers.

FIGS. 1a and 1b show two views of an embodiment of a rotationally actuated position sensor 100. FIG. 1a is a perspective view and FIG. 1b is a cross-section view taken along line 1—1 of FIG. 1a. The position sensor comprises a curved container 102 filled with a viscous fluid 104 and a lighter-weight fluid forming a bubble 106. As the sensor 100 is rotated around either a first axis 120 or second axis 122, the lighter bubble 106 moves within the viscous fluid 104 in reaction to gravity acting on the viscous fluid 104 and in accordance with the principals of fluid dynamics. The rotation of the sensor 100 around a third axis 124 does not cause the bubble to move within the container 102.

The viscosity of the viscous fluid 104 is sufficient to prevent the bubble 106 from disintegrating while allowing it freedom to move within the viscous fluid 104. In one embodiment, the viscous fluid 104 is a light-weight oil and the bubble 106 contains nitrogen gas. The weight of the oil is dependent on the size of the container 102 and the desired velocity of the bubble 106. The substitution of other fluids and/or gases with these and other required qualities as discussed later will be apparent to those skilled in the art.

The container 102 is positioned between a radiation source 108 and a radiation detector 110. Position sensing circuitry 112 is coupled to the radiation detector 110 to translate signals generated by the radiation detector 110 into position coordinates. The position sensing circuitry 112 is further coupled to a read-out device (not shown), such as a digital numeric display or a computer, that presents the position coordinates to a user in a desired format. The radiation source 108, the radiation detector 110 and the position sensing circuitry 112 are further electrically coupled to a power supply such as a battery or an AC source which is not shown.

As shown in FIG. 2, the viscous fluid 104 is substantially opaque to the wavelength of radiation emitted by the radiation source 108 but the lighter-weight fluid forming the bubble 106 is substantially transparent to the same wavelength so that a portion, or beam, 202 of the radiation passes through the bubble 106 and activates a section of the radiation detector 110 while the remainder of the radiation 204 is substantially blocked by the viscous fluid 104. Each section of the radiation detector 110 is assigned a pair of position coordinate values that define a point on a flat plane in a cartesian reference system. In an alternate embodiment, each pair of coordinate values defines a point in terms of spherical coordinates, such as altitude and azimuth, so that the sensor 100 can be used to determine positions on a curved plane. The position of the bubble 106 in the container 102 determines which section of the radiation detector 110 is activated by the beam 202 and thus what coordinate values are transmitted by the position sensing circuitry 112 to the read-out device.

The position coordinates are relative to an origin point within the container 102. In one embodiment, the origin point is fixed within the container 102; in an alternate embodiment, the location of the origin point in the container 102 is defined by the position sensing circuitry 112. In a further alternate embodiment, the origin point is a previous position of the bubble 106 and the position sensing circuitry 112 transmits the difference in position coordinates between the base position and a new position of the bubble 106 as it moves within the container 102.

The sensitivity of the radiation detector 110 to the wavelength of the light emitted by the radiation source 108 determines the percentage of the radiation that the viscous fluid 104 must absorb (the "opaqueness" of the fluid). The required opaqueness can be an inherent property of the fluid chosen, or the viscous fluid 104 can be "dyed" to absorb the emitted wavelength. In one embodiment, the radiation emitted from the radiation source 108 is visible light and the viscous fluid 104 is a light-weight oil infused with a substance such as graphite that absorbs visible light. The use of alternate pigments to dye the viscous fluid 104 to the required opaqueness will be apparent to those skilled in the art.

Figure 3A:
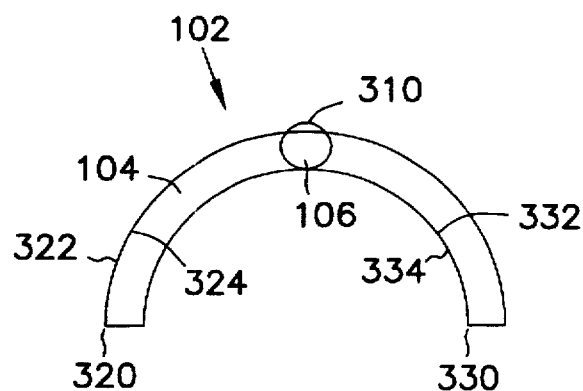
FIG. 3a is a cross-section view of a hemispherical-shaped container in the position sensor.
Figure 3B:
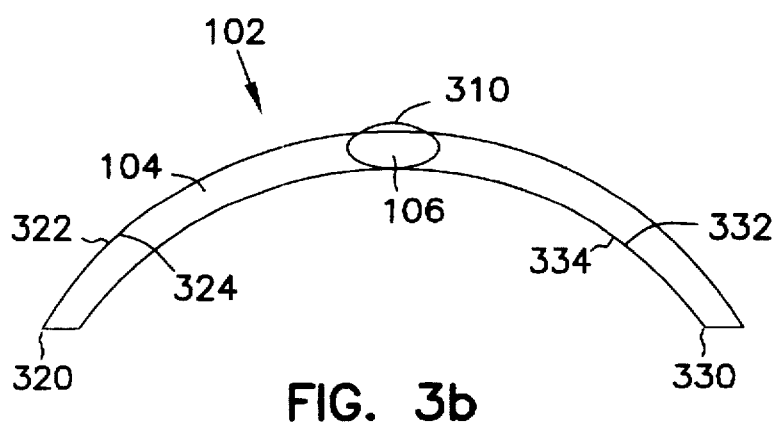
FIG. 3b is a cross-section view of a dome-shaped embodiment of the container.

FIGS. 3a and 3b show cross sectional views of two embodiments of the container 102 of the position sensor. In both figures, the container 102 is formed from two curved surfaces 320 and 330, and the bubble 106 touches both surfaces 320 and 330. Each surface 320 and 330 is formed of continuous, smooth arcs so each surface has a single convex side 322 and 332 and a single concave side 324 and 334. The surfaces have similar curvatures and are substantially concentrically aligned so that the concave side 324 of one surface, referred to as the outer surface 320, is substantially equidistant from the convex side 332 of the other surface, referred to as the inner surface 330. The curvatures of the surfaces 320 and 330 determines the shape of the container 102 so that if the degrees of curvature are substantially 180°, a hemispherical container is formed as shown in FIG. 3a, and if less than 180°, a dome-shaped container is formed as shown in FIG. 3b. The use of surfaces with other degrees of curvature, including 360° to form a container in the shape of a complete sphere, will be apparent to those skilled in the art. Furthermore, the use of curved segments from surfaces of three-dimensional objects other than regular spheres, such as oblate spheroids or elliptic paraboloids, will also be apparent to those skilled in the art. The choice of surface curvature determines whether the velocity of the bubble 106 is constant throughout the container 102 and also determines the range of bubble movement when the container 102 is rotated.

The surfaces 320 and 330 are formed of a thin material that is substantially transparent to the wavelength emitted by the radiation source 108. In one embodiment, a sheet of acrylic is heat-pressed to the desired curvature to form at least one of the surfaces; in another embodiment, liquid urethane plastic is poured into a mold with the desired curvature. Both these alternate embodiments provide surfaces substantially transparent to visible light. The use of alternate materials and manufacturing methods for making the container 102 will be apparent to those skilled in the art.

Figure 5:
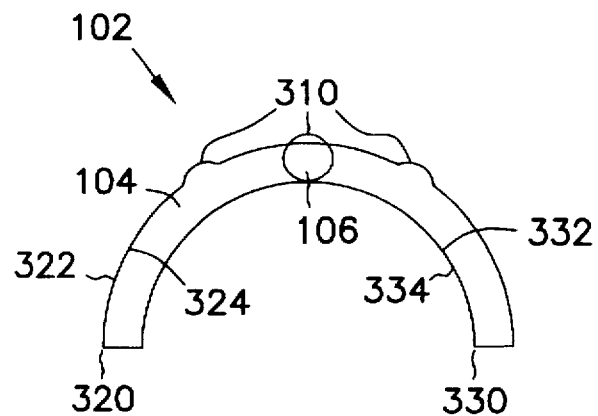
FIG. 5 is the cross-section view of FIG. 3a showing a plurality of dimples.

The transmission of position coordinates caused by slight, accidental movements of the bubble 106 within the container 102 reduce the accuracy of the sensor 100. In one further alternate embodiment the viscosity of the viscous fluid 104 provides a damping effect so that minor vibrations do not cause the bubble 106 to move. In still another alternate embodiment, the construction of the container 102 combines with the position sensing circuitry 112 to filter out unintentional movements. The curvature of the container 102 causes the bubble 106 to return to a neutral location within the container when the sensor 100 is at rest. A dimple 310 is formed in the concave side 324 of the outer surface 320 at the neutral location. During manipulation of the sensor 100 by a user, the bubble 106 moves away from the dimple 310. If the user continues to move the sensor 100 so that the bubble 106 moves back toward the dimple 310, the bubble 106 transits the dimple 310 without stopping because of the inertia imparted by the user. However, if the bubble 106 moves toward the dimple 310 because the user is no longer moving the sensor 100 or because of minor vibrations, the bubble 106 lodges in the dimple 310 and the position sensing circuitry 112 registers the position change as only "noise." The sensor 100 can have more than one neutral position depending on its shape and application, and thus have more than one dimple 310 as shown in FIG. 5. The dimples 310 are small enough in size so as to not significantly interfere with the radiation transmission through the bubble 106.

The bubble 106 exists due to the property of fluids to form a curved surface, or a "meniscus," where the fluid comes in contact with a container. In a further alternate embodiment, the viscous fluid 104 chosen has a meniscus that is highly reflective to the wavelength of the radiation from the radiation source 108. The reflective quality of the meniscus reduces diffusion of radiation through the viscous fluid 104 in the areas where the viscous fluid 104 is thinnest and is less opaque to the radiation.

The size of the areas where the bubble 106 is in contact with the surfaces 320 and 330 determines the diameter of the beam 202 of radiation transmitted through the bubble 106. The size of these areas is determined by the size of the bubble 106 and the distance between the inner and outer surfaces 330 and 320. The size of the bubble 106 is determined by the type and amount of the lighter-weight fluid introduced into the container 102 and the viscosity of the viscous fluid 104.

Figure 4:
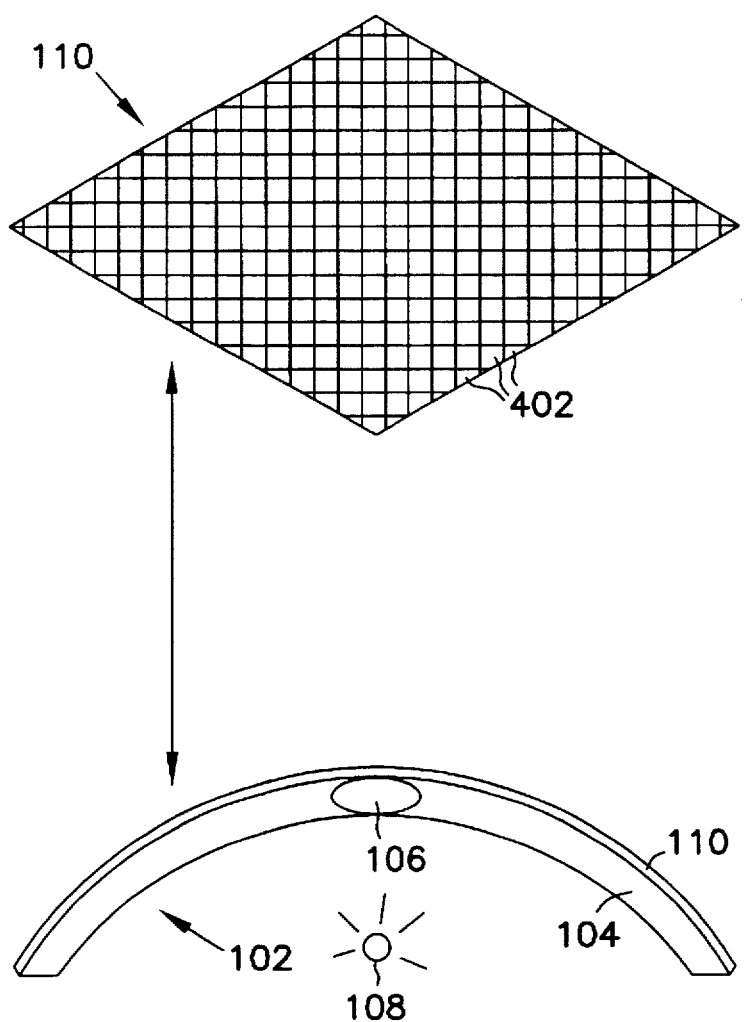
FIG. 4 is the cross-section view of FIG. 3b with the addition of a radiation detector.

In the radiation detector 110 as shown in FIG. 4, each section of the radiation detector 110 is a radiation responsive grid element 402 sensitive to the wavelengths of radiation emitted by the radiation source 108. For visible light, each grid element 402 can be a sensor such as a silicon pin photodiode, part number BPV23NFL, from Telefunken of Germany. Many other photodiodes or other types of sensors from various manufacturers are also suitable. The minimum size of the grid elements 402 is determined by the diameter of the beam 202 transmitted through the bubble 106. The number of grid elements 402 and the shape of the radiation detector 110 depend upon the specific application using the sensor 100. FIG. 4 also shows a portion of the radiation detector 110 and illustrates a grid configuration where the grid elements 402 are abutted edge to edge to form a sensor array. Such a sensor array is manufactured by affixing the grid elements 402 to a silicon base or onto a flexible sheet made of a material such as Mylar® which can be stretched to fit over the container 102. Alternate manufacturing methods and materials suitable to construct a radiation detector of an appropriate size and shape will be apparent to those skilled in the art.

In an alternate embodiment, more than one sensor is activated by the beam 202 of radiation transmitted through the bubble 106. The position sensing circuitry 112 interpolates the signals from all the activated sensors to a single coordinate pair using well-known algorithms similar to those currently in use in touch pad input devices such as the Glide Point from Cirque. In a further embodiment in which the position sensor 100 has a plurality of dimples 310 as shown in FIG. 5, the radiation detector 110 has a corresponding plurality of radiation responsive grid elements 402.

Figure 6A:
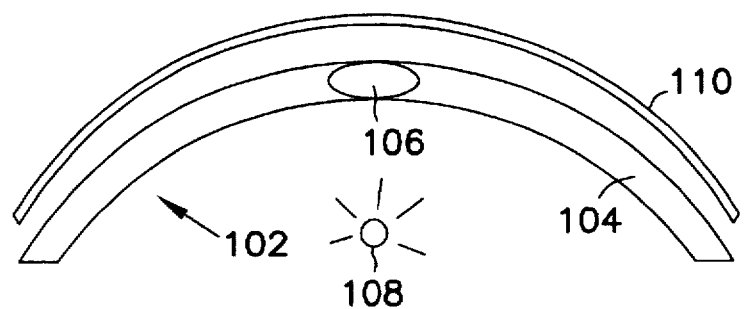
FIG. 6b is an alternate embodiment of position sensor shown in FIG. 4.
FIG. 6c is another alternate embodiment of position sensor shown in FIG. 4.
Figure 6B:
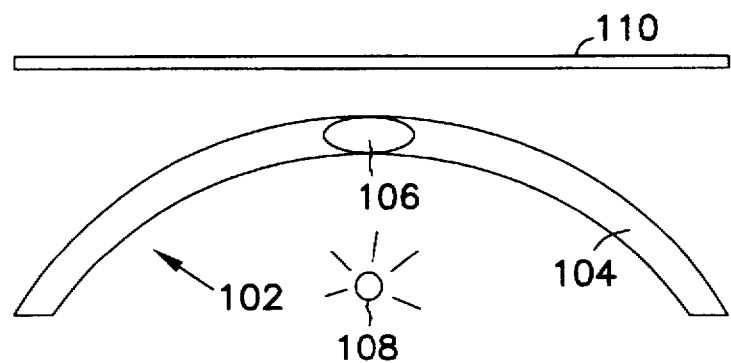

FIG. 4 further illustrates the radiation detector 110 as having a curvature substantially similar to that of the outer surface 320 and affixed to the convex side 322 of the outer surface 320 of the container 102. In an alternate embodiment shown in FIG. 6a, the curvature of the radiation detector 110 is also substantially similar to that of the outer surface 320 but is spaced apart from the outer surface 320. In still another embodiment shown in FIG. 6b, the radiation detector 110 is a flat plane positioned adjacent to the outer surface 320. Other locations for the radiation detector 110 will be apparent to those skilled in the art. In such cases, the individual grid elements 402 are mapped to desired coordinate pairs based on their position relative to the bubble 106 and the radiation source 108.

The radiation source 108 is positioned to substantially evenly illuminate the radiation detector 110. In one embodiment, the radiation source 108 is positioned below the concave side 334 of the inner surface 330 of the container 102 as shown in FIGS. 1a and 1b. In an alternate embodiment shown in FIG. 4, the radiation source 108 is positioned within a cavity bounded by the concave side 334 of the inner surface 330. The radiation can directly illuminate the container 102 or be routed through a diffuser designed to more evenly distribute the radiation. In still another embodiment, the radiation source 108 comprises a plurality of light pipes, one for each radiation responsive grid element 402.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A position sensor comprising:
   inner and outer curved surfaces substantially concentrically aligned to form a container therebetween, wherein the container is filled with a viscous fluid and a lighter-weight fluid such that a bubble of the lighter-weight fluid is created that changes position within the container as the sensor is moved, and wherein the bubble is in contact with both the inner and the outer curved surfaces;
   a source of electro-magnetic radiation positioned to illuminate substantially all the container at one time so that a portion of the radiation is transmitted through the bubble; and
   a radiation detector positioned opposite the radiation source so that the portion of the radiation transmitted through the bubble activates a section of the detector corresponding to the position of the bubble within the container.

2. The sensor of claim 1, wherein the lighter-weight fluid is nitrogen gas and the viscous fluid is a light-weight oil infused with graphite that substantially absorbs visible light emitted by the radiation source.

3. The sensor of claim 1, wherein a meniscus formed by the viscous fluid is reflective to the radiation emitted by the radiation source.

4. The sensor of claim 1, wherein the radiation source comprises a plurality of light pipes.

5. The sensor of claim 1, wherein the radiation detector comprises a plurality of radiation responsive grid elements that are activated by the radiation emitted by the radiation source.

6. The sensor of claim 1, further comprising:
   position sensing circuitry that equates a point in a two-dimensional coordinate system to the position of the bubble within the container and translates a signal generated by the activated section of the detector into position coordinates for the point.

7. The sensor of claim 6, wherein the two-dimensional coordinate system is a cartesian coordinate system for referencing positions lying in a flat plane.

8. The sensor of claim 6, wherein the two-dimensional coordinate system is a spherical coordinate system for referencing positions lying in a curved plane.

9. The sensor of claim 6, wherein the position coordinates are relative to an origin point within the two-dimensional coordinate system.

10. The sensor of claim 6, wherein the origin point is a fixed location within the container.

11. The sensor of claim 6, wherein the location of the origin point within the container changes as the sensor is moved.

12. The sensor of claim 1, wherein the inner and outer surfaces each has a curvature and each further comprises a convex side and a concave side.

13. The sensor of claim 12, wherein the curvatures of the inner and outer surfaces form a hemispherical container.

14. The sensor of claim 12, wherein the curvature of the inner and outer surfaces form a container shaped substantially like one-half of an oblate spheroid.

15. The sensor of claim 12, wherein the concave side of the outer surface is substantially equidistant from the convex side of the inner surface throughout the container so that the bubble does not substantially change as it moves within the container.

16. The sensor of claim 12, wherein a dimple is formed in the concave side of the outer surface to trap the bubble.

17. The sensor of claim 16, wherein the dimple is one of a plurality of dimples, and the radiation detector comprises a plurality of radiation responsive grid elements corresponding to the plurality of dimples.

18. The sensor of claim 12, wherein the radiation detector has a substantially similar curvature as the outer surface of the container.

19. The sensor of claim 18, wherein the radiation detector is spaced apart from the convex side of the outer surface.

20. The sensor of claim 18, wherein the radiation dectector is affixed to the convex side of the outer surface.

21. The sensor of claim 12, wherein the radiation source is positioned within a cavity bounded by the concave side of the inner surface.

22. The sensor of claim 12, wherein the radiation source is positioned adjacent to the concave side of the inner surface.

23. A method of generating position coordinates for points in a two-dimensional coordinate system in a curved container with a viscous fluid and a lighter-weight fluid so that a bubble of the lighter-weight fluid is formed that contacts both surfaces of the curved container and that changes position within the container in response to movements of the container, comprising the steps of:

rotating the container in at least one direction corresponding to the curvature of the container;

illuminating substantially all the container at one time with radiation from a radiation source so that a portion of the radiation is transmitted through the bubble and remaining portions of the radiation is blocked by the viscous fluid;

activating a section of a radiation detector with the radiation transmitted through the bubble; and translating a signal from the activated section of the radiation detector into position coordinates for the point corresponding to the position of the bubble in the container.

* * * * *

UNITED STATES PATENT AND TRADEMARK OFFICE
CERTIFICATE OF CORRECTION

PATENT NO. : 5,794,355

DATED : August 18, 1998

INVENTOR(S) : Larry A. Nickum

It is certified that error appears in the above-identified patent and that said Letters Patent is hereby corrected as shown below:

On the title page,

At [56] References Cited, under Foreign Patent Documents, please insert

| | | |
|---|---|---|
| "582873 | 10/31/1976 | Switzerland |
| WO93/15377 | 08/05/1993 | PCT |
| WO96/03736 | 02/08/1996 | PCT" |

Signed and Sealed this

Twenty-fifth Day of May, 1999

*Attest:*

Q. TODD DICKINSON

*Attesting Officer*     *Acting Commissioner of Patents and Trademarks*